E. TAYLOR.
Harvesters.

No. 137,506.

Patented April 1, 1873.

Witnesses:
G. Matthys
Solon C. Kemon

Inventor:
Enoch Taylor
Per
Attorneys.

UNITED STATES PATENT OFFICE.

ENOCH TAYLOR, OF MEMPHIS, TENNESSEE.

IMPROVEMENT IN HARVESTERS.

Specification forming part of Letters Patent No. 137,506, dated April 1, 1873; application filed February 27, 1873.

*To all whom it may concern:*

Be it known that I, ENOCH TAYLOR, of Memphis, in the county of Shelby and State of Tennessee, have invented a new and Improved Cotton-Picker; and I do hereby declare the following to be a full, clear, and exact description of the same, reference being had to the accompanying drawing forming a part of this specification, in which—

Figure 1:
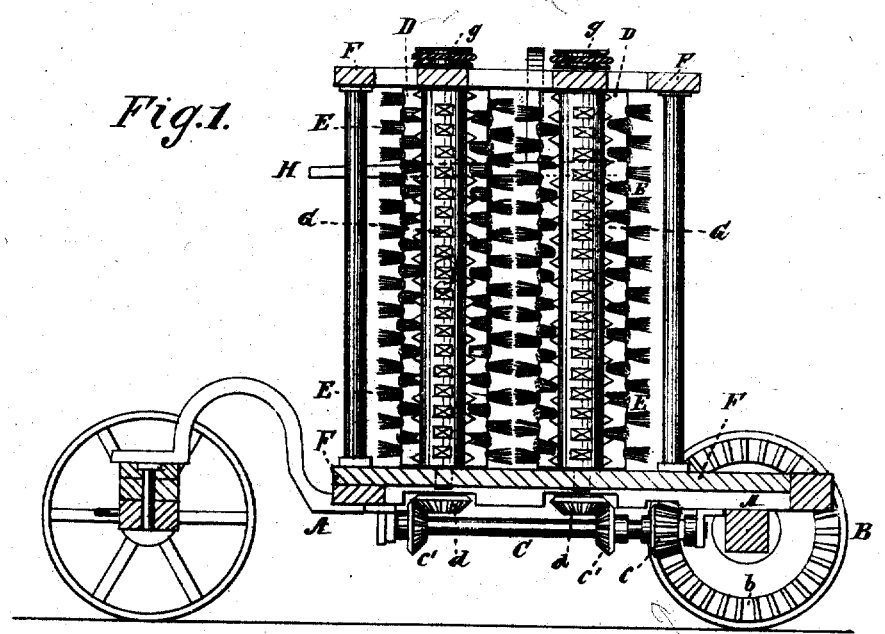
Figure 2:
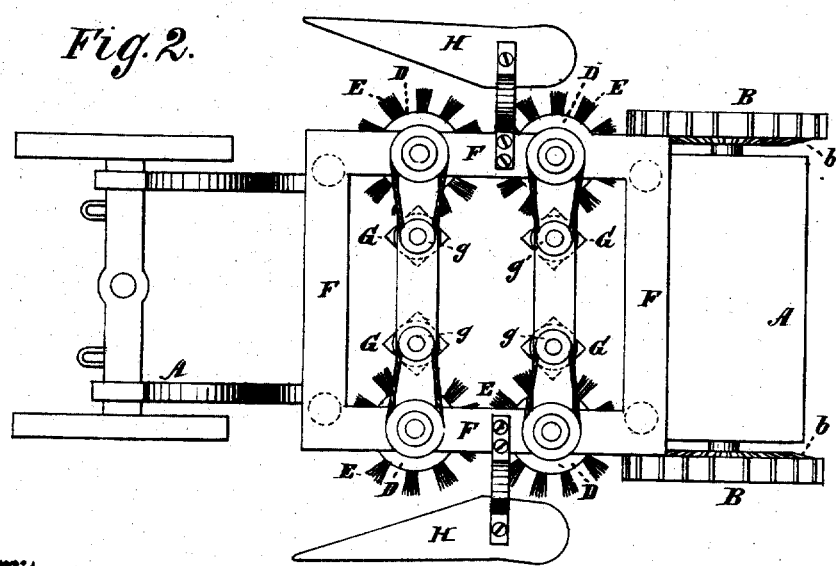

Figure 1 is a longitudinal vertical section, and Fig. 2 a top view.

The invention consists in the improvement of cotton-pickers, as hereinafter described and pointed out in the claim.

A in the drawing represents the running-gear of a vehicle upon which my improved cotton-picker is placed. B B represent the rear wheels, each of which is provided with a side bevel-wheel, $b$, that gears with the bevel-pinions $c$ on shafts C. $c'$ $c'$ are two other bevel-pinions on each shaft C that turn bevel-pinions $d$ on the ends of the journals of upright cylinders D. On these cylinders D, and at right angles thereto, are located the rows of brushes E. These cylinders are journaled in the frame F, and have on the ends of these upper journals pulleys by which the combs G (having pulleys $g$) may be rotated. H H are guides tapered on the inner side and outwardly to a point. One is attached to each side of the frame, preferably by an elastic strap, so that the stalks will be drawn toward the revolving brushes. These guides may be increased to catch stalks of low growth.

Having thus described my invention, what I claim as new, and desire to secure by Letters Patent, is—

1. The combination of brush-cylinders D E having bevel-pinions $d$, the shaft C having bevel-pinions $c$ $c'$, and the wheels having pinions $d$, as and for the purpose described.

2. The pairs of brush-cylinders D E arranged on the vehicle on each side of frame F, one in the rear of the other, to operate as and for the purpose set forth.

3. A guide, H, suspended over side of vehicle and with respect to brush-cylinder D E, as and for the purpose specified.

ENOCH TAYLOR.

Witnesses:
   H. BENSDORF,
   B. J. COLEMAN.